United States Patent
Zaruba et al.

(10) Patent No.: US 10,412,051 B2
(45) Date of Patent: Sep. 10, 2019

(54) SYSTEM AND METHOD FOR SATELLITE COMMUNICATIONS LINK

(71) Applicant: Honeywell International Inc., Morris Plains, NJ (US)

(72) Inventors: Radek Zaruba, Decin (CZ); David Whittleton, Alveston (GB); Andrew James Fraser, Cheltenham (GB)

(73) Assignee: Honeywell International Inc., Morris Plains, NJ (US)

( * ) Notice: Subject to any disclaimer, the term of this patent is extended or adjusted under 35 U.S.C. 154(b) by 143 days.

(21) Appl. No.: 15/427,890

(22) Filed: Feb. 8, 2017

(65) Prior Publication Data
US 2018/0227272 A1    Aug. 9, 2018

(51) Int. Cl.
*H04L 29/06*     (2006.01)
*H04B 7/185*     (2006.01)
*H04B 1/3822*    (2015.01)

(52) U.S. Cl.
CPC ....... *H04L 63/0281* (2013.01); *H04B 1/3822* (2013.01); *H04B 7/1851* (2013.01); *H04B 7/18508* (2013.01); *H04L 63/061* (2013.01); *H04L 63/062* (2013.01); *H04L 63/0853* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 6,353,779 B1 * | 3/2002 | Simon | ............... | H04B 7/18506 244/1 R |
| 6,760,778 B1 * | 7/2004 | Nelson | ............... | H04B 7/18506 455/431 |
| 7,020,708 B2 * | 3/2006 | Nelson | ............... | H04B 7/18506 455/431 |
| 8,219,799 B1 * | 7/2012 | Lucchesi | ............... | H04L 63/105 713/150 |

(Continued)

OTHER PUBLICATIONS

Esa, "Thaumas Phase 1: Satellite Communication for Air Traffic Management (Iris)", "ARTES Programmes", "https://artes.esa.int/projects/thaumas-phase-1", Retrieved May 14, 2018, pp. 1-5.
Godoy, "Meeting Report Data Link (DLK) Systems Subcommittee", "Subcommittee held Jul. 26-27, 2016", Oct. 28, 2016, pp. 1-193, Published in: London, United Kingdom.

(Continued)

*Primary Examiner* — Jason Chiang
(74) *Attorney, Agent, or Firm* — Bookoff McAndrews, PLLC (57) ABSTRACT

In one embodiment, a secure communications processor is provided. The secure communications data processor comprises a satellite datalink gateway; wherein the satellite datalink gateway is configured to translate data, to be transmitted to or received from a satellite communications system, from a first internet protocol to at least one of a second internet protocol or another protocol, and to be received by or transmitted from a router; a satellite communications link processor coupled to the satellite datalink gateway; and wherein the secure communications data processor is configured to be coupled between at least one router and a satellite communications radio system, and to be installed in a vehicle separately from the at least one router and the satellite communications radio system.

20 Claims, 5 Drawing Sheets

(56) References Cited

U.S. PATENT DOCUMENTS

| | | | |
|---|---|---|---|
| 2002/0007234 A1* | 1/2002 | Heppe | H04B 7/18506 701/10 |
| 2002/0032006 A1* | 3/2002 | Nair | H04B 7/18506 455/430 |
| 2006/0059537 A1* | 3/2006 | Alvermann | G06F 21/72 726/1 |
| 2007/0183435 A1* | 8/2007 | Kettering | H04L 49/604 370/401 |
| 2010/0042272 A1* | 2/2010 | Gruyer | H04L 12/5692 701/8 |
| 2014/0169562 A1* | 6/2014 | Billonneau | H04L 63/0272 380/270 |
| 2014/0380433 A1 | 12/2014 | Yerger | |
| 2015/0131703 A1* | 5/2015 | Balter | H04B 7/18513 375/133 |
| 2016/0315692 A1* | 10/2016 | Ahluwalia | H04B 7/18528 |
| 2017/0026808 A1* | 1/2017 | Johnson | H04W 4/046 |

OTHER PUBLICATIONS

Inmarsat, Esa's Artes Programmes, "Satellite Communication for Air Traffic Management (Iris)", "IRIS Precursor—IRIS precursor service development, https://artes.esa.int/projects/iris-precursor", Jan. 25, 2017, pp. 1-6, Published in: US.

Inmarsat, "Swiftbroadband Safety Takes Flight for First Time", "http://www.inmarsat.com/news/swiftbroadband-safety-takes-flight-firs-time/", Jan. 25, 2017, pp. 1-3, Published in: US.

Inmarsat, David Coiley, "Inmarsat Aviation Safety Services Update", "http://www.inmarsat.com/wp-content/uploads/2013/10/Inmarsat_APC_2013_25_David_Coiley.pdf", Jun. 13, 2013, pp. 1-24, Published in: US.

Morse, D.C. et al.; "Next Generation FANS over Inmarsat Broadband Global area Network (BGAN)"; Digital Avionics Systems Conference, 2004. DASC 04. The 23rd Salt Lake City, UT, USA Oct. 24-28, 2004, Piscataway, NJ, USA.

European Extended Search Report, dated May 22, 2018, issued in related EP application No. 17200290.9 (13 pages).

* cited by examiner

SYSTEM AND METHOD FOR SATELLITE COMMUNICATIONS LINK

BACKGROUND

Aircraft automatically or manually, e.g. through pilots, communicate information during its travel. Aircraft can travel long distances. In many instances, the aircraft are out of range of terrestrial communications systems, for example when they fly over oceans. In such instances, aircraft can communicate using satellite communications systems.

Inmarsat plc provides satellite communications services, including for aviation applications. Inmarsat operates a satellite communications system comprising at least one satellite coupled to at least one ground, or terrestrial, facility. Inmarsat has deployed a SwiftBroadband service for aircraft. The Swiftbroadband service uses internet protocol (IP) based packet switching. However, Enhanced SwiftBroadband Safety service adds encryption to the SwiftBroadband service to provide secure communications between the aircraft and the at least one ground facility. Secure communications prevent third parties from deleteriously interfering with communications to and from the aircraft. Satellite communications radio systems for aircraft are being developed to include such capabilities.

Many aircraft presently include a satellite communications radio system capable of operating on the frequency bands used by Inmarsat satellites and are capable of using the SwiftBroadband service. Those satellite communications radio systems are not capable of utilizing the Enhanced Swiftbroadband Safety service because they do not include technology to form an encrypted connection with a service gateway of the at least one ground facility. Accordingly, it is desirable to facilitate existing satellite communications transceivers to use the Enhanced Swiftbroadband Safety service.

SUMMARY

In one embodiment, a secure communications processor is provided. The secure communications data processor comprises a satellite datalink gateway; wherein the satellite datalink gateway is configured to translate data, to be transmitted to or received from a satellite communications system, from a first internet protocol to at least one of a second internet protocol or another protocol, and to be received by or transmitted from a router; a satellite communications link processor coupled to the satellite datalink gateway; and wherein the secure communications data processor is configured to be coupled between at least one router and a satellite communications radio system, and to be installed in a vehicle separately from the at least one router and the satellite communications radio system.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding background and summary, or the following detailed description.

For pedagogical purposes, a vehicle may be described hereinafter as an aircraft. However, it is understood that the teachings herein are applicable to other types of vehicles including without limitation space craft, ships, automobiles, buses, trains, and any other vehicle.

Figure 1:
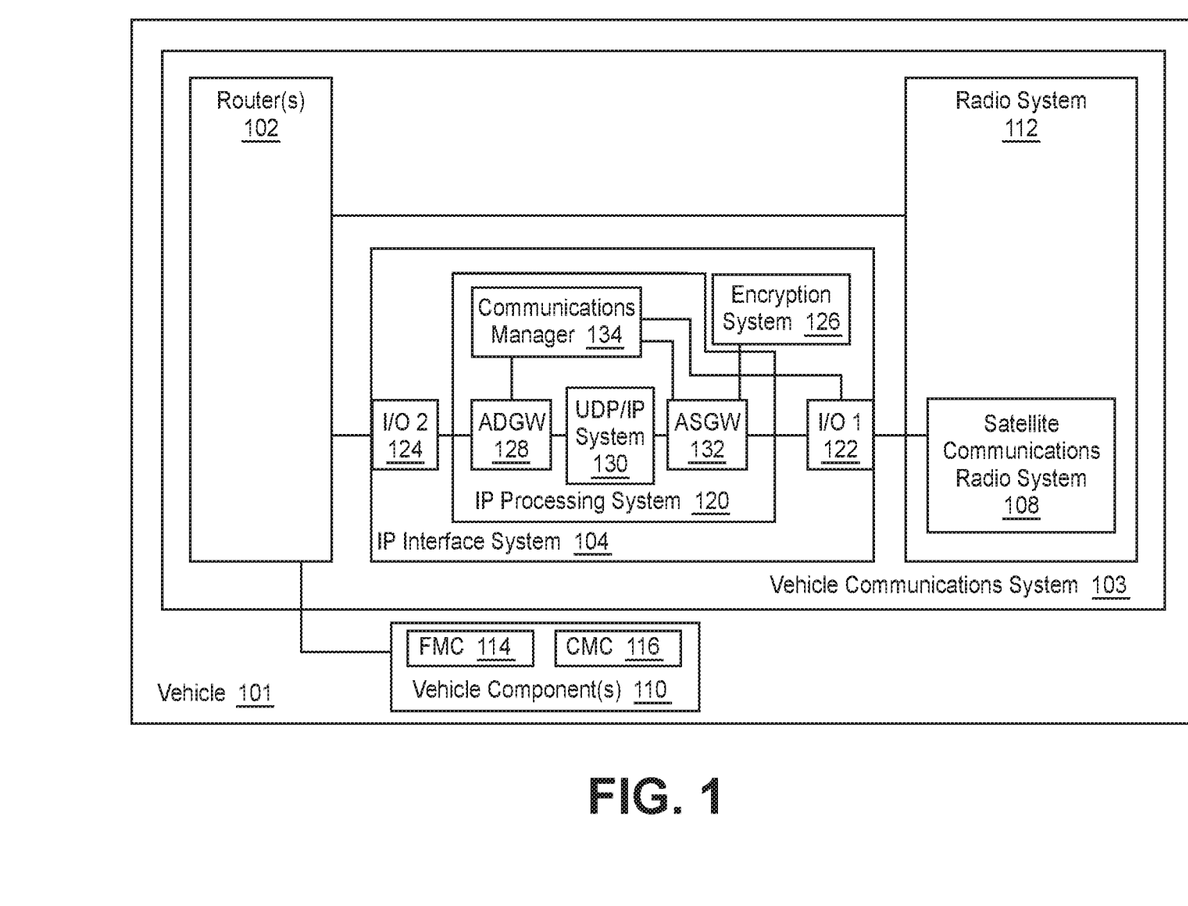
FIG. 1 illustrates a block diagram of an exemplary vehicle with an internet protocol (IP) interface system to facilitate secure communications using IP based packet switching through, and separate from, a satellite communications radio system.

FIG. 1 illustrates a block diagram of an exemplary vehicle 101 with an internet protocol (IP) interface system 104 to facilitate secure communications using IP based packet switching through, and separate from, a satellite communications radio system 108. The vehicle 101 includes a vehicle communications system 103 coupled to at least one vehicle component 110.

In one embodiment, the vehicle communications system 103 includes at least one router 102, an internet protocol (IP) interface system 104, and a radio system 112. The IP interface system 104 remains separate from the satellite communications radio system 108, either existing separately or in another system as is subsequently described; as such the IP interface system 104 is configured to be installed by itself or as part of another system (e.g. the subsequently described router system) in the vehicle 101 separately from the satellite communications radio system 108. As a result, the IP interface system 104 can be retrofitted to a satellite communications radio system 108 which is incapable by itself of facilitating secure communications using IP based packet switching. In another embodiment, the IP interface system 104 is configured to be inserted between the at least one router 102 and the satellite communications radio system 108, where each of which is configured to be separately installed in the vehicle 101.

In one embodiment, the at least one router 102 is coupled to at least one vehicle component 110, the IP interface system 104, and the radio system 112. The radio system 112 includes at a satellite communications radio system 108

(including antenna and any other appropriate equipment). The satellite communications radio system 108 is incapable by itself of facilitating secure communications using IP based packet switching. In another embodiment, the radio system 112 includes at least one other communications transceiver, such as HF, VHF, cellular, WiFi, WiMax, and/or any other type of communications transceivers.

The at least one vehicle component 110 includes at least one component of the vehicle 101 that transmits and receives information to and from other locations. In one embodiment, such other locations may include a vehicle traffic control center, a vehicle operations center, or other vehicles. In another embodiment, the at least one component includes a flight management computer 114 and/or a central maintenance computer 116. In a further embodiment, the at least one vehicle component 110 may generate information, e.g. in the form of messages in different formats. In yet another embodiment, the formats may include aircraft communications addressing and reporting systems (ACARS), aeronautical telecommunication network (ATN) open systems interconnection (OSI), and ATN internet protocol suite (IPS). In yet a further embodiment, such data may be encoded to be transmitted or received by respectively a specific communications transceiver and a vehicle component. The router 102 routes data in the different formats from vehicle components through the communications transceivers and satellite communications systems, e.g. satellite(s), to peer components on the ground or in other vehicles.

The satellite communications radio system 108 is configured to transmit and receive respectively data to and from a satellite communications system, such the Inmarsat satellite system, that uses internet protocol (IP) based packet switching, such as the Swiftbroadband service. In another embodiment, the internet protocol is internet protocol version 4. In a further embodiment, the internet protocol is internet protocol version 6.

In one embodiment, the satellite communications system is a wide area network, and the vehicle communications system 103 is a local area network. The satellite communications radio system 108 does not include technology to form an encrypted connection between such wide area network and local area network.

The IP interface system 104 facilitates such a connection. The IP interface system 104 may also be referred herein as a secure communications data processor. In one embodiment, the IP interface system 104 includes an IP processing system 120 coupled to a first input/output (I/O) interface (I/O 1) 122, a second input/output (I/O) interface (I/O 2) 124, and an encryption system 126. The first I/O interface 122 and the second I/O interface 124 are data interfaces. In one embodiment, the first I/O interface 122 is an Ethernet interface allowing a point to point connection between the IP interface system 104, and the satellite communications radio system 108 and the corresponding satellite communications system. In another embodiment, e.g. at the direction of a communications manager in the IP processing system 120, a point-to-point protocol over Ethernet (PPPoE) system, e.g. in the first I/O interface 122, virtually 'dials' a ground facility of the satellite communications system. In a further embodiment, the second I/O interface 124 is an ARINC 429 or Ethernet interface allowing a point to point connection between the IP interface system 104 and the at least one router 102. The IP interface system 104 receives and transmits data, e.g. messages, respectively from and to the router 102 through the second I/O interface 124. The IP interface system 104 receives and transmits such data respectively from and to the satellite communications radio system 108 through the first I/O interface 122.

The encryption system 126 is used only if the airborne security gateway 132 (ASGW) is used. The encryption system 126 includes at least one encryption key. In one embodiment, the encryption system 126 is compatible with internet protocol security (IPsec). In another embodiment, the encryption system 126 includes a public key and a private key. In a further embodiment, the encryption system 126 is implemented with a card, such as a subscriber identity module (SIM) card or a personal computer memory card international association (PCMCIA) card. Although the encryption system 126 is illustrated as being separate from the IP processing system 120, in yet another embodiment, the encryption system 126 can be within or part of the IP processing system 120.

The IP processing system 120, which is separate from the at least one router 102 and the radio system 112, shall now be described. In one embodiment, the IP processing system 120 includes an airborne security gateway (ASGW) 132, a UDP/IP system (UDP/IP) 130, an airborne datalink gateway (ADGW) 128, and a communications manager 134. The airborne security gateway (ASGW) 132 is coupled to the UDP/IP system 130, communications manager 134, encryption system 126, and the first I/O interface 122. In another embodiment, the airborne security gateway 132 is not used; in such case, the encryption system 126 is not used. In a further embodiment, the UDP/IP system 330 may be incorporated into another component, e.g. the airborne security gateway 332 or the airborne datalink gateway 328. In yet a further embodiment, a TCP/IP system may be used in lieu of a UDP/IP system.

In one embodiment, the airborne datalink gateway 128 is configured to translate data, to be transmitted to or received through a satellite communications system, from a first internet protocol, e.g. IP version 4, to at least one of a second internet protocol, e.g. IP version 6, or another protocol, such as ACARS, ATN OSI, or ATN IPS, to be respectively received by or transmitted from the at least one router 102. ATN IPS utilizes IP version 6. The airborne datalink gateway 128 may also be referred to as a satellite datalink gateway.

If used, the airborne security gateway 132 is a security endpoint with a counterpart security endpoint, a ground security gateway, in the ground facility of the satellite communications system creates a secure communications link that is encrypted, such as a virtual private network, through the satellite communications system and between such security endpoints. From the ground security gateway to a final destination, the data travels over one or more secure links established between the ground facility and the final destination.

The airborne security gateway 132 utilizes a security protocol, such as IPsec, and the at least one encryption keys of the encryption system. The airborne security gateway 132 may be referred to herein as a satellite data security gateway. In one embodiment, ATN IPS messages bypass the airborne security gateway 132 because, e.g., virtual private network system is built into the at least one router 102 in the aircraft and a ground endpoint which form a secure connection.

The airborne datalink gateway 128 is connected to the ground data gateway through a UDP/IP subnet. The UDP/IP system 130 adds UDP/IP headers to packets being transmitted or received by the vehicle 101. In another embodiment, the UDP/IP system 130 can be a TCP/IP system that adds TCP/IP headers to packets being transmitted or received by the vehicle 101.

In one embodiment, the airborne datalink gateway 128 facilitates point to point communications the ground datalink gateway. The airborne datalink gateway 128 (and the ground datalink gateway) use a protocol, such as the AIGI (or AAP) protocol, to form messages sent between the two gateways. The protocol wraps messages, e.g. ACARS, ATN OSI, and ATN IPS messages, with a header comporting to the protocol. In another embodiment, the protocol header includes at least one of a message type (e.g. ACARS), message number, session identification number, time stamp, and location stamp.

The communications manager 134 manages the first I/O interface 122, airborne security gateway 132, and the airborne datalink gateway 128. The communications manager 134 may be referred to herein as the satellite communications link processor. The communications manager 134 instructs the first I/O interface 122 to dial ground facility using the PPPoE. The communications manager 134 is aware with Ethernet connectivity is achieved. Then, if it is used, the communications manager 134 directs the airborne security gateway 132, if used, to form a secure, encrypted link with the ground security gateway. Finally, the communications manager 134 directs the airborne datalink gateway 128 to form a datalink with the ground datalink gateway. When the communications manager 134 is informed by the airborne datalink gateway 128 that the datalink has been formed, the IP interface system 104, e.g. the airborne datalink gateway 128 or the communications manager 134, inform the router 102 that it is ready to begin sending and receiving data.

Figure 2:
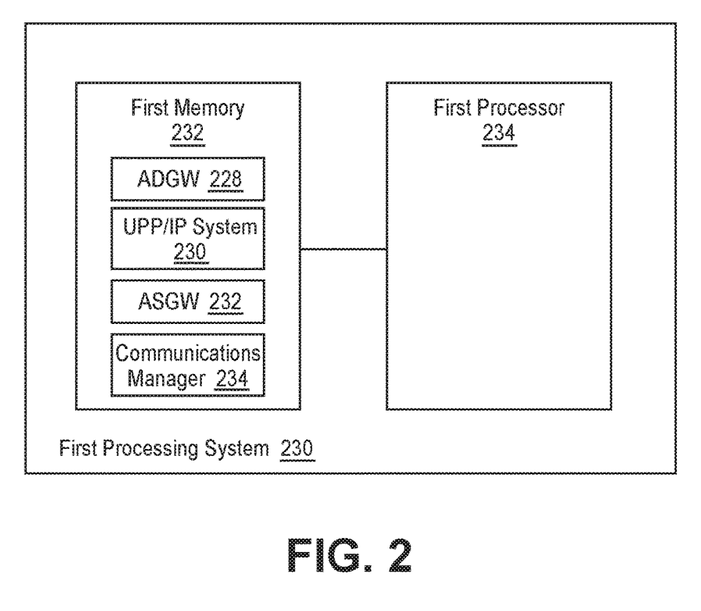
FIG. 2 illustrates a block diagram of an exemplary first processing system.

FIG. 2 illustrates a block diagram of an exemplary first processing system 230. The processing system 230 comprises a first memory 232 and a first processor 234. In one embodiment, the airborne data gateway 228, the UDP/IP system 230, the airborne security gateway 232 (if used), and the communications manager 234 are embodied in software stored in the first memory 232, and executed on the first processor 234. In another embodiment, the first processing system 230 may be part of at least one vehicle component 110, e.g. the flight management computer 114 or the central maintenance computer 116.

Figure 3:
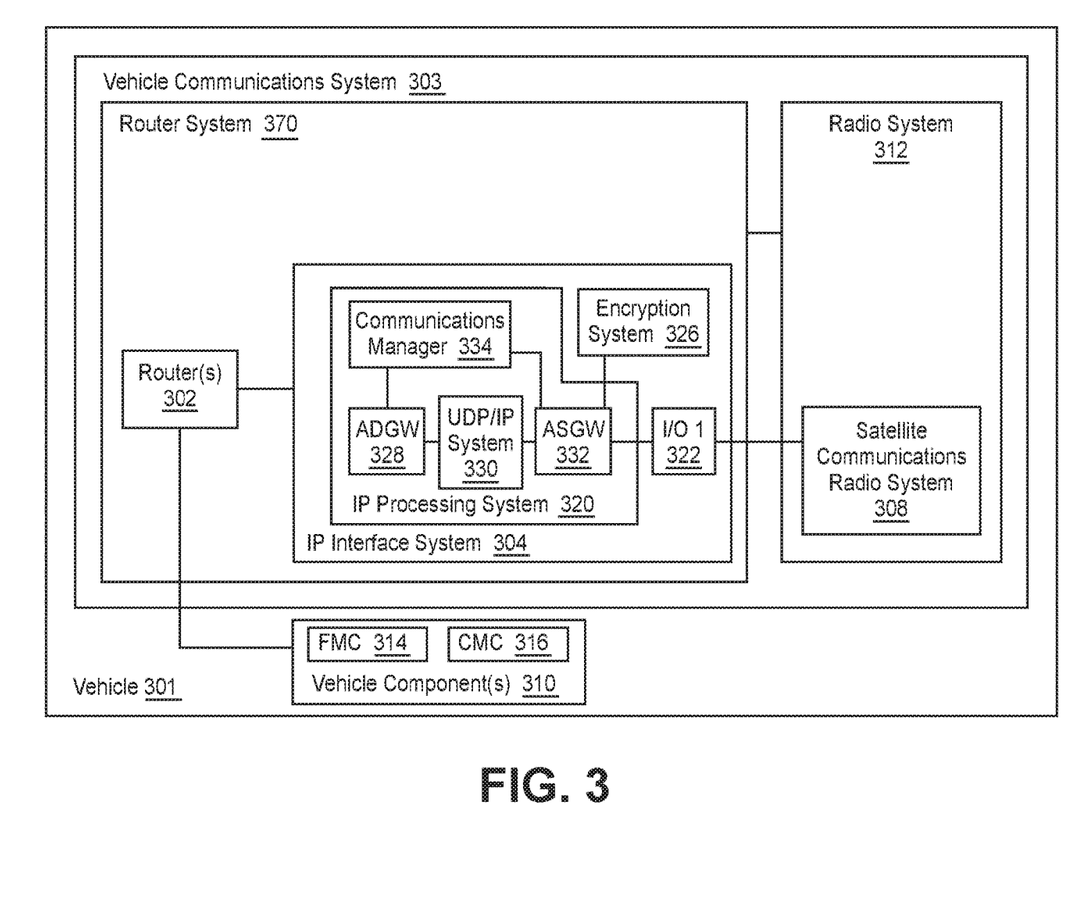
FIG. 3 illustrates a block diagram of another exemplary vehicle with an IP interface system configured to facilitate secure communications using IP based packet switching through a satellite communications radio system, and to be discretely installed in the vehicle.

FIG. 3 illustrates a block diagram of another exemplary vehicle 301 with an IP interface system 304 configured to facilitate secure communications using IP based packet switching through a satellite communications radio system, and to be discretely installed in the vehicle 101 (satellite communications radio system) 308. In this embodiment, the vehicle 301 includes a vehicle communications system 303 coupled to at least one vehicle component 310. The vehicle communications system 303 comprises a router system 370 coupled to a radio system 312. The radio system 112 includes at a satellite communications radio system 308 (including antenna and any other appropriate equipment). In another embodiment, the radio system 312 includes at least one other communications transceiver, such as HF, VHF, cellular, WiFi, WiMax, and/or any other type of communications transceivers.

In one embodiment, the vehicle communications system 303 includes a router system 370 and a radio system 312. The radio system 312 includes at least a satellite communications radio system 308 (including antenna and any other appropriate equipment). The satellite communications radio system 308 is incapable by itself of facilitating secure communications using IP based packet switching. In another embodiment, the radio system 312 includes at least one other communications transceiver, such as HF, VHF, cellular, WiFi, WiMax, and/or any other type of communications transceivers.

In one embodiment, the router system 370 includes at least one router 302 coupled to an IP interface system 304. In a further embodiment, the at least one router 302 is configured to be coupled to the at least one vehicle component 310.

The IP interface system 304 remains separate from the satellite communications transceiver 308. As a result, the IP interface system 304 can be retrofitted to a satellite communications radio system 308 which is incapable by itself of facilitating secure communications using IP based packet switching.

The at least one vehicle component 310 includes components of the vehicle 101 that transmit and receive information to and from other locations as described above. In one embodiment, the at least one component includes a flight management computer 314 and/or a central maintenance computer 316. In another embodiment, the at least one vehicle component 310 may generate information, e.g. in the form of messages in different formats. In a further embodiment, the formats may include aircraft communications addressing and reporting systems (ACARS), aeronautical telecommunication network (ATN) open systems interconnection (OSI), and ATN internet protocol suite (IPS). In yet a further embodiment, such data may be encoded to be transmitted on or received by respectively a specific communications transceiver and a vehicle component. The router 302 routes data in the different formats from vehicle components through the communications transceivers and a satellite communications system, e.g. satellite(s), to peer components on the ground or in other vehicles.

In the embodiment of FIG. 3, the at least one router 302 includes the IP interface system 304. The IP interface system 304 receives data, e.g. messages, from other components of the router 302 such as ACARS, ATN/OSI and/or ATN/IPS protocol stacks. In one embodiment, the IP interface system 304 includes an IP processing system coupled to an encryption system 326 and a first I/O interface 322. In another embodiment, the IP processing system 120 includes an airborne security gateway (ASGW) 332, a UDP/IP system (UDP/IP) 330, an airborne datalink gateway (ADGW) 328, and a communications manager 334. In a further embodiment, the encryptions system 326 and the airborne security gateway 332 are not used. In yet another embodiment, the UDP/IP system 330 may be incorporated into another component, e.g. the airborne security gateway 332 or the airborne datalink gateway 328. In yet a further embodiment, a TCP/IP system may be used in lieu of the UDP/IP system 330.

The airborne security gateway 332 is coupled to the UDP/IP system 130, the communications manager 334, the encryption system 326, and the first I/O interface 322. The airborne security gateway 332 may also be referred to herein as a satellite data security gateway. The communications manager 334 may be referred to herein as the satellite communications link processor.

In one embodiment, the airborne datalink gateway 328 is configured to translate data received from a satellite communications system from a first internet protocol to at least one of a second internet protocol, or another protocol such as ACARS, ATN OSI, or ATN IP. The airborne datalink gateway 328 may also be referred to herein as a satellite datalink gateway. The IP interface system 304 and its components serve the same functions as described above.

The IP interface system 304 may also be referred to a secure communications data processor.

Figure 4:
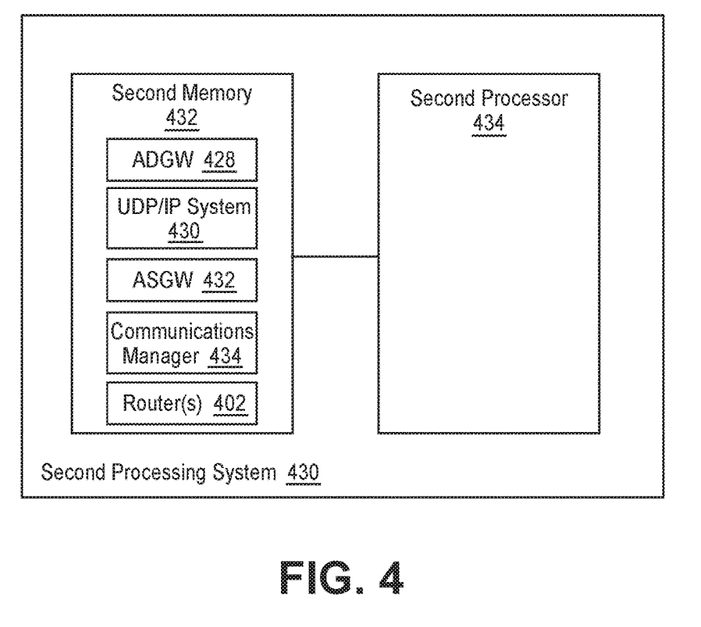
FIG. 4 illustrates a block diagram of an exemplary second processing system.

FIG. 4 illustrates a block diagram of an exemplary second processing system 430. The second processing system 430 comprises a second memory 432 and a second processor 434. In one embodiment, the airborne data gateway 228, the UDP/IP system 230, the airborne security gateway 232, the communications manager 234, and the at least one router 402 are embodied in software stored in the second memory 232, and executed on the second processor 234. In another embodiment, the second processing system 230 may be part of at least one vehicle component 110, e.g. the flight management computer 114 or the central maintenance computer 116.

Figure 5:
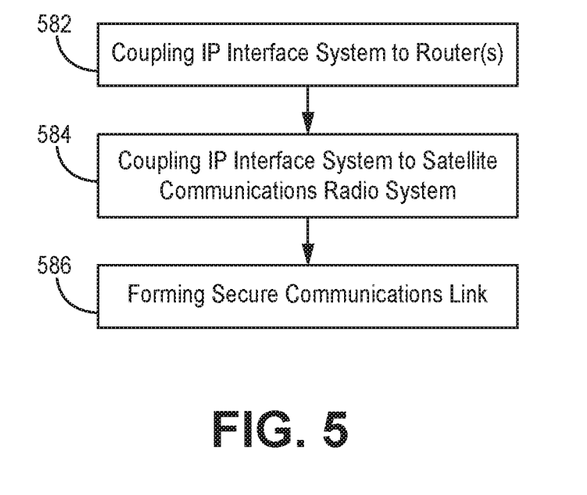
FIG. 5 illustrates an exemplary method utilizing an internet protocol (IP) interface system.

FIG. 5 illustrates an exemplary method utilizing an internet protocol (IP) interface system 104. In one embodiment, in block 582, the IP interface system 104 is coupled to at least one router 102. In block 584, the IP interface system 104 is coupled to the satellite communications radio system 108. In one embodiment, the router system 370, including the IP interface system 304, is coupled to the satellite communications radio system 308.

In block 586, a secure communications link using internet protocol based packet switching is formed between the IP interface system 104 and the satellite communications radio system 108, and through a satellite communications system to a ground facility of the satellite communications system. In one embodiment, a secure communications link using internet protocol based packet switching is formed between router system 370 (including the IP interface system 104) and the satellite communications radio system 308, and through a satellite communications system to ground facility.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A secure communications data processor configured to be coupled between at least one router and a radio system, and to be installed in a vehicle separately from the at least one router and the radio system, the secure communications data processor comprising:
   a satellite datalink gateway configured to translate data from a first internet protocol to at least one of a second internet protocol or another protocol by wrapping/unwrapping the data in one or more messages with a protocol header comporting to a protocol, the protocol header including at least one of a message type, message number, session identification number, time stamp, and/or location stamp;
   a satellite data security gateway coupled to the satellite datalink gateway and an encryption system; and
   a satellite communications link processor coupled to and configured to manage the satellite datalink gateway and the satellite data security gateway to connect the at least one router to a satellite communications radio system of the radio system,
   wherein the satellite communications link processor is configured to manage the satellite datalink gateway and the satellite data security gateway by:
      directing the satellite data security gateway to form a secure, encrypted link with a ground security gateway by using the encryption system and the satellite communications radio system;
      directing the satellite datalink gateway to form a datalink with a ground datalink gateway by using the secure, encrypted link with the ground security gateway; and
      when informed that the datalink has been formed, informing the at least one router that the secure communications data processor is ready to begin sending and receiving data over the datalink.

2. The secure communications data processor of claim 1, wherein the satellite data security gateway forms a security endpoint with a counterpart security endpoint, the counterpart security endpoint being the ground security gateway.

3. The secure communications data processor of claim 2, wherein the encryption system is a card including at least one encryption key.

4. The secure communications data processor of claim 1, wherein data transmitted to or received by the satellite communications radio system uses one of Internet Protocol version 4 or Internet Protocol version 6.

5. The secure communications data processor of claim 1, further comprising:
   a first I/O interface coupled to the satellite data security gateway and the satellite communications link processor, and configured to be coupled to the satellite communications radio system;
   a second I/O interface coupled to the satellite datalink gateway, and configured to be coupled to the at least one router; and
   one of a TCP/IP and a UDP/IP system, coupled to the satellite datalink gateway and the satellite data security gateway.

6. The secure communications data processor of claim 1, further comprising:
   a memory;
   a processor coupled to the memory;
   wherein at least one of the satellite datalink gateway and the satellite communications link processor reside in the memory, and are executed on the processor.

7. The secure communications data processor of claim 6, wherein the memory and processor reside in a vehicle component.

8. A vehicle communications system, comprising:
   a radio system; and
   a router system, comprising:
      at least one router;
      a secure communications data processor coupled to the at least one router and a satellite communications radio system of the radio system,
      wherein the secure communications data processor comprises:
         a satellite datalink gateway configured to translate data from a first internet protocol to at least one of a second internet protocol or another protocol by wrapping/unwrapping the data in one or more messages with a protocol header comporting to a protocol, the protocol header including at least one of a message type, message number, session identification number, time stamp, and/or location stamp,
         a satellite data security gateway coupled to the satellite datalink gateway, an encryption system, and the satellite communications radio system;
         wherein the satellite data security gateway is configured to form a secure, encrypted link with a ground security gateway by using the encryption system and the satellite communications radio system, and wherein the satellite datalink gateway is configured to form a datalink with a ground datalink gateway by using the secure, encrypted link with the ground security gateway, wherein the router system is configured to be installed in a vehicle separately from the radio system and the satellite communications radio system.

9. The vehicle communications system of claim 8, further comprising one of a UDP/IP system and a TCP/IP system, coupled to the satellite data security gateway and the satellite datalink gateway.

10. The vehicle communications system of claim 9, wherein the encryption system is a card including at least one encryption key.

11. The vehicle communications system of claim 8, wherein the at least one router is configured to route incoming messages in at least one of the following protocols: aircraft communications addressing and reporting systems (ACARS), aeronautical telecommunication network (ATN) open systems interconnection (OSI), and ATN internet protocol suite (IPS).

12. The vehicle communications system of claim 8, wherein data transmitted to or received by the satellite communications radio system uses one of Internet Protocol version 4 and Internet Protocol version 6.

13. The vehicle communications system of claim 8, wherein the secure communications data processor further comprises a first I/O interface coupled to the satellite data security gateway and the satellite communications link processor, and configured to be coupled to the satellite communications radio system.

14. The vehicle communications system of claim 8, further comprising:
a memory;
a processor coupled to the memory;
wherein at least one of the satellite datalink gateway and the satellite communications link processor reside in the memory and are executed on the processor.

15. The vehicle communications system of claim 14, wherein the memory and processor reside in a vehicle component.

16. A method, comprising:
coupling a secure communications data processor to a satellite communications radio system which is configured to be mounted in a vehicle separately from the secure communications data processor; and
mounting the secure communications data processor in the vehicle,
wherein the secure communications data processor includes:
a satellite datalink gateway configured to translate data from a first internet protocol to at least one of a second internet protocol or another protocol by wrapping/unwrapping the data in one or more messages with a protocol header comporting to a protocol, the protocol header including at least one of a message type, message number, session identification number, time stamp, and/or location stamp;
a satellite data security gateway coupled to the satellite datalink gateway and an encryption system; and
a satellite communications link processor coupled to the satellite datalink gateway and the satellite data security gateway and configured to manage the satellite datalink gateway and the satellite data security gateway,
wherein the secure communications data processor is configured to be coupled between at least one router and a radio system, and to be installed in a vehicle separately from the at least one router and the radio system,
wherein the radio system includes the satellite communications radio system that is connected to the at least one router by the satellite datalink gateway and the satellite data security gateway,
wherein the satellite communications link processor is configured to manage the satellite datalink gateway and the satellite data security gateway by:
directing the satellite data security gateway to form a secure, encrypted link with a ground security gateway by using the encryption system and the satellite communications radio system;
directing the satellite datalink gateway to form a datalink with a ground datalink gateway by using the secure, encrypted link with the ground security gateway; and
when informed that the datalink has been formed, informing the at least one router that the secure communications data processor is ready to begin sending and receiving data over the datalink.

17. The method of claim 16, wherein coupling the secure communications data processor to the satellite communications radio system comprises coupling the router system, comprising the secure communications data processor coupled to the at least one router, to the satellite communications radio system; and
mounting the secure communications data processor in the vehicle comprises mounting the router system in the vehicle.

18. The method of claim 16, further comprising:
coupling the secure communications data processor to the at least one router.

19. The method of claim 16, further comprising:
forming the datalink with an internet protocol based packet switching between the secure data processor and the satellite communications radio system, through a satellite communications system to a ground facility of the satellite communications system.

20. The method of claim 19, wherein the forming the datalink includes:
forming the datalink using internet protocol based packet switching between the router system and the satellite communications radio system, and the satellite communications system.

* * * * *